(12) United States Patent
Müller et al.

(10) Patent No.: US 11,375,102 B2
(45) Date of Patent: Jun. 28, 2022

(54) DETECTION OF IMAGE DATA OF A MOVING OBJECT

(71) Applicant: Sick AG, Waldkirch (DE)

(72) Inventors: Romain Müller, Waldkirch (DE); Tobias Pontiggia, Waldkirch (DE)

(73) Assignee: SICK AG, Waldkirch (DE)

(*) Notice: Subject to any disclaimer, the term of this patent is extended or adjusted under 35 U.S.C. 154(b) by 0 days.

(21) Appl. No.: 17/225,596

(22) Filed: Apr. 8, 2021

(65) Prior Publication Data

US 2021/0321042 A1   Oct. 14, 2021

(30) Foreign Application Priority Data

Apr. 9, 2020   (DE) .................. 10 2020 109 929.0

(51) Int. Cl.
*H04N 5/232*   (2006.01)

(52) U.S. Cl.
CPC .............................. *H04N 5/232125* (2018.08)

(58) Field of Classification Search
CPC ......... H04N 5/232125; H04N 5/23222; H04N 5/232121; G01S 7/497; G01S 17/10; G01S 17/88; G02B 7/08; G02B 7/32; G03B 17/38; G03B 13/20; G03B 13/36
See application file for complete search history.

(56) References Cited

U.S. PATENT DOCUMENTS

| | | | |
|---|---|---|---|
| 4,445,767 A | 5/1984 | Kawazoe | |
| 9,270,878 B2 | 2/2016 | Ono | |
| 2004/0036795 A1 | 2/2004 | Fujii et al. | |
| 2014/0055662 A1 | 2/2014 | Torabi | |
| 2019/0281199 A1* | 9/2019 | Muller | .............. G01B 11/02 |
| 2020/0005006 A1 | 1/2020 | Müller et al. | |
| 2021/0352214 A1* | 11/2021 | Muller | ............. H04N 5/232121 |

FOREIGN PATENT DOCUMENTS

| | | |
|---|---|---|
| DE | 102004049482 A1 | 4/2006 |
| DE | 202013101489 U1 | 6/2013 |
| DE | 102018102917 B3 | 1/2019 |
| DE | 102018105301 A1 | 9/2019 |
| DE | 102018120807 A1 | 2/2020 |
| EP | 3537339 A2 | 2/2019 |
| EP | 3537339 A3 | 2/2019 |
| JP | 2005-215373 A | 8/2005 |

OTHER PUBLICATIONS

English translation of DE 102004049482 (Year: 2004).*
Office Action dated Oct. 29, 2020 for application No. DE10 2020 109 929.0.

* cited by examiner

*Primary Examiner* — Timothy J Henn
*Assistant Examiner* — Angel L Garces-Rivera
(74) *Attorney, Agent, or Firm* — Nath, Goldberg & Meyer; Jerald L. Meyer

(57) ABSTRACT

A camera for detecting an object moved through a detection zone is provided that has an image sensor for recording image data, a reception optics having a focus adjustment unit for setting a focal position, a distance sensor for measuring a distance value from the object, and a control and evaluation unit connected to the distance sensor and the focus adjustment unit to set a focal position in dependence on the distance value, and to trigger a recording of image data at a focal position at which there is a focus deviation from a focal position that is ideal in accordance with the measured distance value, with the focus deviation remaining small enough for a required image definition of the image data.

20 Claims, 3 Drawing Sheets

DETECTION OF IMAGE DATA OF A MOVING OBJECT

FIELD

The invention relates to a camera and to a method for detecting image data of an object moved through a detection zone.

BACKGROUND

Cameras are used in a variety of ways in industrial applications to automatically detect object properties, for example for the inspection or for the measurement of objects. In this respect, images of the object are recorded and are evaluated in accordance with the task by image processing methods. A further use of cameras is the reading of codes. Objects with the codes located thereon are recorded using an image sensor and the code zones are identified in the images and then decoded. Camera-based code readers also cope without problem with different code types than one-dimensional barcodes which also have a two-dimensional structure like a matrix code and provide more information. The automatic detection of the text of printed addresses, (optical character recognition, OCR) or of handwriting is also a reading of codes in principle. Typical areas of use of code readers are supermarket cash registers, automatic parcel identification, sorting of mail shipments, baggage handling at airports, and other logistic applications.

A frequent detection situation is the installation of the camera above a conveyor belt. The camera records images during the relative movement of the object stream on the conveyor belt and instigates further processing steps in dependence on the object properties acquired. Such processing steps comprise, for example, the further processing adapted to the specific object at a machine which acts on the conveyed objects or a change to the object stream in that specific objects are expelled from the object stream within the framework of a quality control or the object stream is sorted into a plurality of partial object streams. If the camera is a camera-based code reader, the objects are identified with reference to the affixed codes for a correct sorting or for similar processing steps.

The camera is frequently a part of a complex sensor system. It is, for example, customary in reading tunnels on conveyor belts to install a plurality of camera-based code readers next to one another, on the one hand, to cover a larger conveyor belt width and, on the other hand, to install them from different perspectives to record objects from a plurality of sides. The geometry of the conveyed objects is furthermore frequently measured in advance using a separate laser scanner to determine focus information, trigger times, image zones with objects and the like from it.

Without advance information of a laser scanner on the object spacings, whether an image is recorded in a focused focal position can be determined using the contrast. To set the focus in this manner, a large number of images have to be recorded and this is in particular not possible with recordings in a relative movement because the object is possibly already no longer in a suitable recording position when the correct focal position has been found.

Another option is to measure the distance from the object using the camera itself. However, this means that the focal position to be set only becomes known at a late time and, depending on the adjustment distance, there is no longer sufficient time to adapt the focal position until the object is at its recording position. These temporal conditions are eased by an upstream distance measurement, for example by laser scanner. However, this means additional effort and/or cost for the procurement, installation, and setup of this laser scanner. In addition, this admittedly provides sufficient time for a focus change for individual objects, but not for the case that two objects of different heights follow closely on one another.

A distance sensor that is based on a time of flight (TOF) process is integrated in a camera in DE 10 2018 105 301 A1. A height profile is thus measured and different functions are implemented' with reference thereto. One of these functions is the setting of the focal position of a reception optics. The addressed problem of times that are too short for a focus adjustment is, however, not discussed.

SUMMARY

It is therefore the object of the invention to achieve an improved recording of images in a suitably set focal position.

This object is satisfied by a camera and by a method for detecting image data from objects moved through a detection zone in accordance with the respective independent claim. The camera and the object are in relative motion with respect to one another and the objects to be recorded thereby move into or through the detection zone of the camera. An image sensor records images or image data of the detection zone and thus of an object located there. To produce focused images, a focally adjustable reception optics is provided, that is a reception objective, that has one or more lenses and other optical elements depending on the quality demands. A distance sensor measures a distance value for the distance between the camera and the object to be recorded. A control and evaluation unit acts as a focus adjustment unit. For this purpose, it receives the distance value from the distance sensor and sets the focal position of the reception optics with reference to this distance value. The control and evaluation unit is preferably additionally connected to the image sensor to read, pre-process, evaluate, etc. image data. Alternatively, there are respective separate modules that take care of the focusing, on the one hand, and the other tasks of the camera such as the processing of the image data, on the other hand.

The invention starts from the basic idea of not setting the focal position fully ideally to achieve shorter focusing times. The accepted focal deviation remains within a well-defined and still acceptable framework here. In very illustrative terms, the camera does not focus ideally, but only good enough. The image data are therefore a little blurred, but are still sufficient for a required image definition. The ideal focal position from which there is a focal deviation does not signify a theoretical optimum, but rather that focal position that would have to be set according to the distance measurement. The ideal focal position also has unavoidable deviations due to measurement errors of the distance measurement, tolerances in the focus adjustment, and the like. The focal position in which the image data are recorded intentionally differs from that which the camera could perform with reference to the distance measurement. There is not a lack of performance of the camera to set the ideal focal position, but rather a lack of focusing time.

The invention has the advantage that the focusing time can be cut and the recorded image data are nevertheless usable for the desired purpose. A specific image evaluation such as code reading in particular remains possible. If only very little time is available due to a distance measurement that is comparatively late with respect to the recording time or due to objects following closely after one another, the image data have to be recorded fast enough. Comprises can then be accepted in the blur to still record the image in good time. The portion of image data that are recorded sufficiently in focus thus increases overall and that in turn increases the rate of successful image evaluations, specifically the reading rate in a code reading application.

The control and evaluation unit is preferably configured to determine an available focusing time from that time at which the object will reach the recording position. At this time, a focal position has to be set that permits a sufficiently focused image recording. The focus adjustment can, on the other hand, only start when a distance measurement value of the distance sensor is present and as soon as previous image recordings in a different focal position have been completed, for example for an object of a different height located further forward in the stream of moving objects. The time from which a refocusing can start can accordingly be derived from measurement data of the distance sensor.

The distance sensor is preferably configured to measure the speed of movement of the object. A multizone distance sensor in whose measurement zones the object enters consecutively in the course of the movement is, for example, suitable for this. The speed makes it possible to convert times and positions of the detection of an object by a camera and/or distance sensor and in particular a recording position of the object into one another. Alternatively to a measurement by the distance sensor, the speed is known, parameterized, measured by a further sensor or from earlier image recordings of the camera and is extrapolated, in particular assumed as constant, as required.

The control and evaluation unit is preferably configured to determine a required refocusing time from the instantaneous focal position and the focal position that is ideal in accordance with the measured distance value. The required refocusing time is the counter piece to the available focusing time. The required refocusing time is a property of the installed objective of the reception optics and of the associated focus adjustment. A certain refocusing time is therefore required for a certain adjustment distance, with tolerances and possibly temperature and aging effects being able to be considered and compensated.

An association rule between adjustments from a first focal position into a second focal position and a refocusing time required for this purpose is preferably stored in the control and evaluation unit. The association rule can in particular be predefined as an analytical function or as an approximation, for example an overall or piece by piece linear polynomial function, or as a lookup table (LUT). The respective refocusing times can be calculated or simulated from properties of the objective and the focus adjustment or corresponding calibration measurements are carried out.

The control and evaluation unit is preferably configured to compare the available focusing time with the required refocusing time and only to record image data having a focal deviation when the required refocusing time is not sufficient. A check is therefore made whether it is at all necessary to make a compromise and to record an image with a focus deviation. If the available focusing time is sufficient, the ideal focal position is preferably set.

The control and evaluation unit is preferably configured to perform a focus adjustment to the ideal focal position, but already to record image data as soon as the focus deviation has become small enough for a required image definition. This is one option of recording an image with a well-defined focus deviation. Although it is clear that the available focusing time will not be sufficient to set the ideal focus position, an adjustment thereto is nevertheless made. The image recording, however, takes place prematurely before the ideal focus position has been reached, and indeed at a time at which the still not remaining focus deviation or the still remaining setting distance to the ideal focus position has become small enough to ensure the required image definition. It is here possible to calculate when only the required focus deviation is present for the first time and a triggering can then take place. Alternatively, the available focusing time is used and triggering is at the last moment to come as close as possible to the ideal focal position. The condition still applies that the focus deviation is then small enough, that is this condition is so-to-say over-fulfilled.

The control and evaluation unit is preferably configured to not perform a focus adjustment up to the ideal focal position, but only up to the focus deviation. This is a further possibility of compensation. It is here deliberately not the ideal focal position that is traveled to, but rather a closer focal position having a sufficiently small focus deviation to cut the required refocusing time.

The control and evaluation unit is preferably configured to delay the recording of image data beyond the available focusing time if a focal position having a focus deviation can only then be achieved that is small enough for a required image definition of the image data. There can be situations in which the available focusing time is not even sufficient to set a focal position having the still tolerable focus deviation. It is then not of any use to trigger a recording at the provided time since it is clear in advance that the desired purpose cannot be satisfied with these image data. The image recording is therefore delayed until a recording with the tolerable focus deviation is possible. The object is then no longer in an optimum recording position, but unlike with image data deliberately not recorded in sufficient focus, there is here at least a chance that the desired purpose can still be satisfied.

A distance measurement field of view of the distance sensor preferably at least partly overlaps the detection zone and/or the distance sensor is integrated in the camera. An overlapping field of vision of the distance sensor and the camera means that the distance value is only measured just before the image recording, unlike with an upstream laser scanner, for example. The available focusing time is therefore particularly short, even without the situation that two objects of different heights follow one another directly. The overlap of the fields of vision in particular results when the distance sensor is integrated in the camera. This has a large number of advantages since the system remains compact and encapsulated, the control and evaluation unit has simple internal access to the distance sensor, and a total system is a lot simpler to install and to put into operation. The disadvantages of the comparatively late distance measurement are at least considerably alleviated by the focusing in accordance with the invention.

The distance measurement field of view is preferably oriented such that an object is detected before it enters into the detection zone. The ideal focal position is thereby known earlier so that losses of the available focusing time due to a lack of information are limited. This disadvantage of a distance sensor that is integrated or that is arranged at the camera with respect to an upstream laser scanner is thus at least partially compensated. This can be achieved by a distance measurement field of view that is larger than the detection zone of the camera or in that the distance sensor is directed to the objects moving into the detection zone. Distance values that are measured in this manner must be converted trigonometrically since the obliquely measured distance is different than the later distance from the object during the image recording. This conversion is, however, also at least advantageous when the distance measurement only takes place within the detection zone, only the difference in the angles is then smaller.

The distance sensor is preferably configured as an optoelectronic distance sensor, in particular in accordance with the principle of the time of flight process. Such distance sensors are available as completed chips or modules. The distance sensor particularly preferably has a plurality of SPADs (single photon avalanche photodiodes) that each measure a single time of flight via TDCs (time-to-digital converters).

The control and evaluation unit is preferably configured to evaluate the focus deviation as small enough for a required image definition of the image data when the object is still in a depth of field range according to the distance measurement value on a triggering of the recording of the image data in the set focal position. This is a possible determination when a focus deviations is small enough or when a required image definition is still maintained. For this purpose, the control and evaluation device is preferably aware of an association between the distance and a focus deviation still permitted for this distance. This association is naturally different than the one that determines required focusing times from a current focal position and a focal position to be set. A still permitted focus deviation is here now associated with an ideal focal position and it is a possibility of expressing this criterion that the object is still recorded in the depth of field range. The same applies, however, to the form of the association; it can be predefined as an analytical function or as an approximation, for example as an overall or piece by piece linear polynomial function, or as a lookup table (LUT).

The control and evaluation unit is preferably configured to determine the depth of field range from optical properties. In this embodiment, the depth of field range is to be understood in the narrower optical or physical sense. This can in particular be determined according to the rule $DOFP(d) \sim d^2 Nc/f^2$. DOFp is here the physical depth of field range (DOF=depth of field), d is the distance from the object, N is the numerical aperture of the objective that is thus dependent on the f-number, c is the circle of confusion and corresponds to the degree of permitted blur such as a pixel on the image sensor, and f is the focal length of the reception optics. Most of these parameters are objective constants of the selected reception optics and it can be recognized that due to the quadratic distance dependence of DOFp on d, tighter demands have to be made on the focus deviation in the near zone than in the far zone. This statement is, however, related to the object position and not, for example, to the setting of a focal length or of a focal distance of the reception optics that correlates in a non-linear manner with the focal position defined via the object distance.

The control and evaluation unit is preferably configured to determine the depth of field range from application-specific demands. The depth of field range is accordingly not defined purely physically in dependence on the embodiment, but can rather depend on which evaluation goal is pursued by the image data. It is here not primarily pure depth of field criteria that are important, but rather the question whether the image data will permit the desired evaluation. This may have to be evaluated very differently from application to application.

The control and evaluation unit is preferably configured to read a code content of a code on the object using the image data. The camera thus becomes a camera-based code reader for barcodes and/or 2D codes according to various standards, optionally also for text recognition (optical character recognition, OCR). Before a code is read, a segmentation is even more preferably carried out by which regions of interest (ROIs) are identified as code candidates.

The control and evaluation unit is preferably configured to evaluate the focus deviation as small enough for a required image definition of the image data if the image definition is sufficient to read a recorded code. This can be understood as a preferred case of application-specific demands on the depth of field range; the image should namely be recorded so distinctly that a code can be read. This expectation of when the image definition is sufficient to read a code can be simulated in advance or can be generated by experiment. For this purpose, codes are presented to the camera under typical conditions, for example with reference to environmental light and print quality, at different distances to determine the focus deviation up to which a code is still read (Good Read) or the focus deviation from which the code is no longer read (NoRead). Whether a code can be read can in particular be determined in dependence on a code type, a module size, and/or a decoding process. They are parameters or settings that have a considerable effect on the demands on the image definition. In the terminology of an application-specific depth of field range, this in particular depends on said parameters.

The camera is preferably installed in a stationary manner at a conveying device that leads objects to be detected in a conveying direction through the detection zone. This is a common industrial application of a camera and the conveying device takes care that the objects move through the detection zone. The focus adjustment practically has to be able to react constantly and under tight time constraints due to the constantly changing objects and the strict predetermination of the object changes by the conveying device. The speed of the conveying device and thus of the moving objects can be acquired from a conveyor control, a sensor such as an encoder at the conveying device, or from a parameterization of the conveyor to determine when an object will be located in a recording position and the like.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
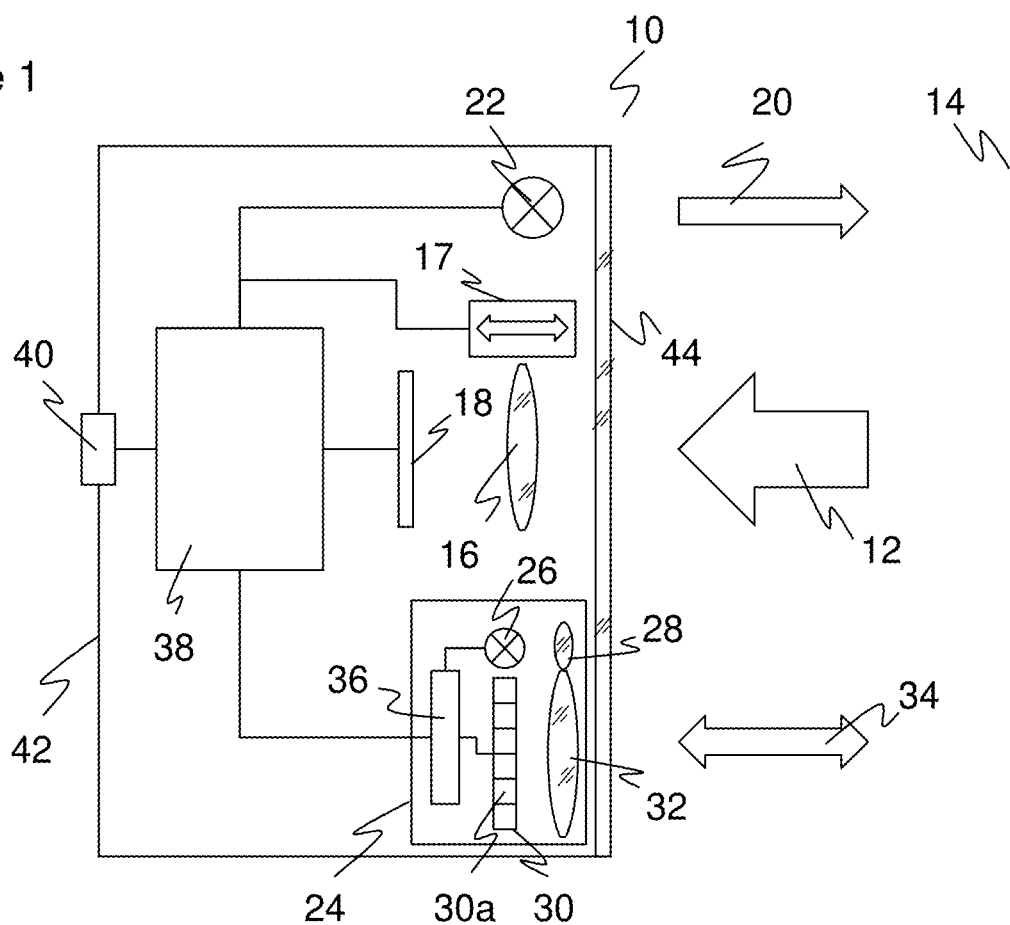
FIG. 1 a schematic sectional representation of a camera with a distance sensor.

FIG. 1 shows a schematic sectional representation of a camera 10. Received light 12 from a detection zone 14 is incident on a reception optics 16 that conducts the received light 12 to an image sensor 18. The optical elements of the reception optics 16 are preferably configured as an objective composed of a plurality of lenses and other optical elements such as diaphragms, prisms, and the like, but here only represented by a lens for reasons of simplicity. The reception optics 16 can be set to different focal positions by means of a focus adjustment 17 to record objects in focus at different distances. The most varied functional principles are conceivable for this purpose, for instance a change of the focal distance by a stepper motor or a moving coil actuator, but also a change of the focal length, for instance by a liquid lens or gel lens.

To illuminate the detection zone 14 with transmitted light 20 during a recording of the camera 10, the camera 10 comprises an optional illumination unit 22 that is shown in FIG. 1 in the form of a simple light source and without a transmission optics. In other embodiments, a plurality of light sources such as LEDs or laser diodes are arranged around the reception path, in ring form, for example, and can also be multi-color and controllable in groups or individually to adapt parameters of the illumination unit 22 such as its color, intensity, and direction.

In addition to the actual image sensor 18 for detecting image data, the camera 10 has an optoelectronic distance sensor 24 that measures distances from objects in the detection zone 14 using a time of flight (TOF) process. The distance sensor 24 comprises a TOF light transmitter 26 having a TOF transmission optics 28 and a TOF light receiver 30 having a TOF reception optics 32. A TOF light signal 34 is thus transmitted and received again. A time of flight measurement unit 36 determines the time of flight of the TOF light signal 34 and determines from this the distance from an object at which the TOF light signal 34 was reflected back.

The TOF light receiver 30 in the embodiment shown has a plurality of light reception elements 30a or pixels and can thus even detect a spatially resolved height profile. Alternatively, the TOF light receiver 30 only has one light reception element 30a or sets off a plurality of measurement values of the light reception elements 30a to one distance value. The design of the distance sensor 24 is purely exemplary and other optoelectronic distance measurements without time of flight processes and non-optical distance measurements are also conceivable. The optoelectronic distance measurement by means of time light processes is known and will therefore not be explained in detail. Two exemplary measurement processes are photomixing detection using a periodically modulated TOF light signal 34 and pulse time of flight measurement using a pulse modulated TOF light signal 34. There are also highly integrated solutions here in which the TOF light receiver 30 is accommodated on a common chip with the time of flight measurement unit 36 or at least parts thereof, for instance TDCs (time to digital converters) for time of flight measurements. In particular a TOF light receiver 30 is suitable for this purpose that is designed as a matrix of SPAD (single photon avalanche diode) light reception elements 30a. For such a SPAD-based distance measurement, a plurality of light reception elements 32 are particularly advantageous that are not used for a spatially resolved measurement, but rather for a statistical multiple measurement with which a more exact distance value is determined. The TOF optics 28, 32 are shown only symbolically as respective individual lenses representative of any desired optics such as a microlens field.

A control and evaluation unit 38 is connected to the focus adjustment 17, to the illumination unit 22, to the image sensor 18, and to the distance sensor 24 and is responsible for the control work, the evaluation work, and for other coordination work in the camera 10. It therefore controls the focus adjustment 17 with a focal position corresponding to the distance value of the distance sensor 24a and reads image data of the image sensor 18 to store them or to output them to an interface 40. The control and evaluation unit 38 is preferably able to localize and decode code zones in the image data so that the camera 10 becomes a camera-based code reader. A plurality of modules can be provided for the different control and evaluation work, for example to perform the focus adaptations in a separate module or to perform pre-processing of the image data on a separate FPGA.

The camera 10 is protected by a housing 42 that is terminated by a front screen 44 in the front region where the received light 12 is incident.

Figure 2:
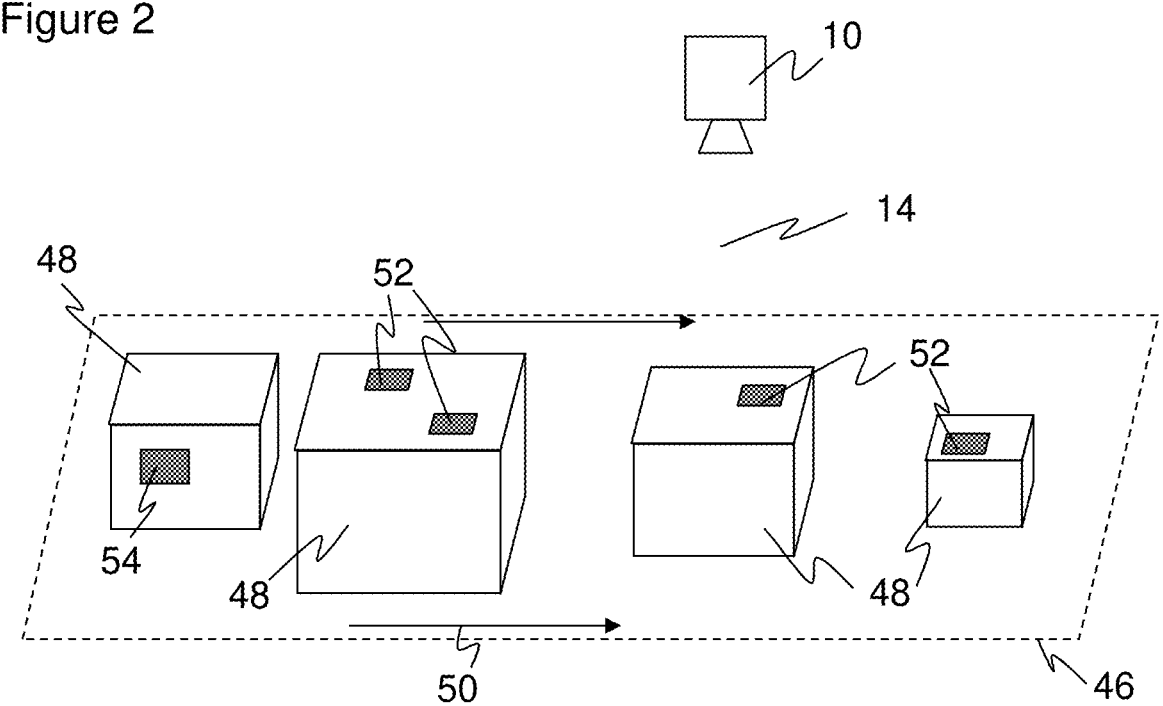
FIG. 2 a three-dimensional view of an exemplary use of the camera in an installation at a conveyor belt.

FIG. 2 shows a possible use of the camera 10 in an installation at a conveyor belt 46. The camera 10 is shown from here only as a symbol and no longer with its structure already explained with reference to FIG. 1. The conveyor belt 46 conveys objects 48, as indicated by the arrow 50, through the detection zone 14 of the camera 10. The objects 48 can bear code zones 52 at their outer surfaces. It is the object of the camera 10 to detect properties of the objects 48 and, in a preferred use as a code reader, to recognize the code zones 52, to read and decode the codes affixed there, and to associate them with the respective associated object 48. In order also to detect object sides and in particular laterally applied code zones 54, additional cameras 10, not shown, are preferably used from different perspectives. In addition, a plurality of cameras 10 can be arranged next to one another to together cover a wider detection zone 14.

Figure 3:
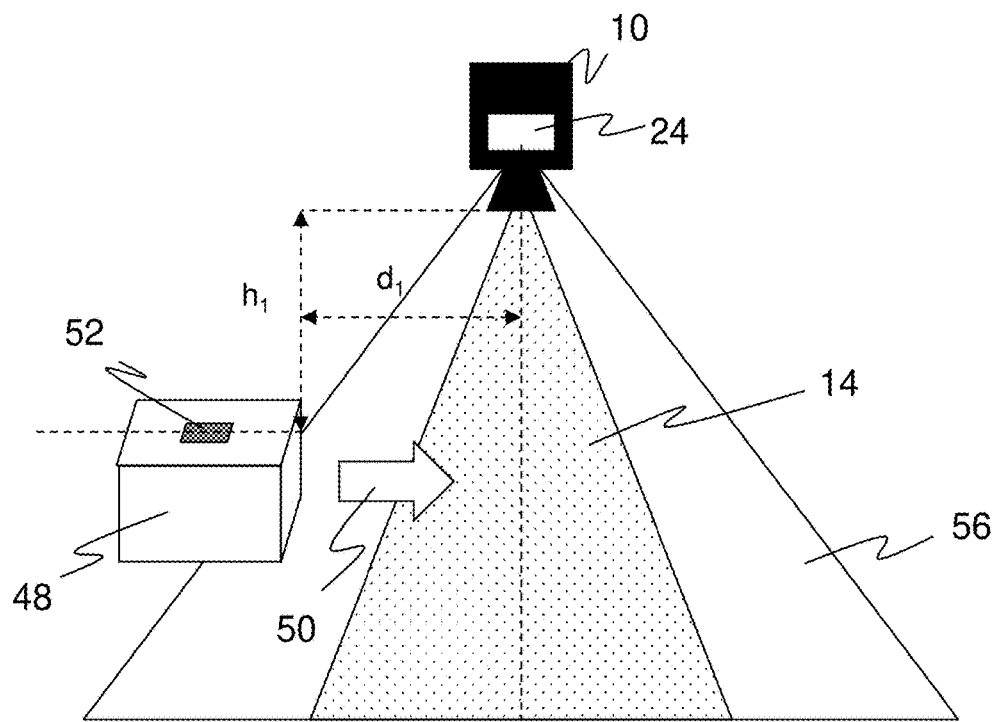
FIG. 3 a representation of a camera and of an object that is moved into its detection zone to explain a focusing method.

FIG. 3 shows a camera 10 having a downwardly directed detection zone 14 as in the situation of FIG. 2. A distance measurement field of view 56 of the distance sensor 24 is larger than the detection zone 14 in this example and includes it. Deviating, overlapping and non-overlapping configurations of the detection zone 14 and the distance measurement field of view 56 are, however, also conceivable. A distance measurement field of view 56 disposed at least partly upstream has the advantage that a distance measurement value is available earlier.

An object 48 to be recorded moves at a velocity v into the detection zone 14. The velocity v, known as a parameter of a conveying device, can be measured by an external sensor such as an encoder, be reconstructed from early image recordings, or can be determined by the distance sensor 24. In the latter case, the distance sensor 24 preferably has a plurality of reception zones of light reception elements 30a into which the object 48 successively enters so that a conclusion can be drawn on the velocity v from the temporal sequence and the measured distances.

The object 48 is detected on entry into the distance measurement field of view 56. The recording should be triggered when it is located at the center of the detection zone 14. The distance $d_1$ has to be covered for this purpose and the time up to this point is given by $t_1 = d_1/v$. The distance $d_1$ still depends on the distance $h_1$ since objects 48 of different heights are detected for the first time at different positions. The distance $h_1$ is in turn measured by the distance sensor 24 and itself has to be converted from the distance value $h_{m1}$ measured obliquely instead of straight by means of $h_1 = h_{m1} \cos \alpha$. Under the assumption that $h_{m1}$ is measured immediately on entry into the distance measurement field of view 56, the angle $\alpha$ in the configuration shown corresponds to half the viewing angle of the distance sensor 24 and is at least known from the fixed configuration. $d_1=h_1 \tan \alpha$ can now also be calculated using these values.

The geometry shown in FIG. 3 and the time behavior are thus known. An available focusing time $dt=t_1$ remains to the camera to set the focal position to the height $h_1$. A correction for inertias and conversely a supplement can be taken into account in the available focusing time dt since it is not the front edge of the object 48 that is to be recorded, but rather the object center.

It can conversely be determined which refocusing time DT is required to refocus from the current focal position to an ideal focal position in accordance with the measured distance $h_1$. This can be achieved, for example, by a pre-calibration of the focus adjustment 17. The most varied focus adjustments from a value $h_1$ to a value $h_2$ are therefore carried out and in so doing the time until the new focal position has been adopted is determined. A theoretical system observation or a simulation can also be used instead. There is as a result at least a function or lookup table that associates a required refocusing time DT with a pair $(h_1, h_2)$. An exemplary value for a maximum adjustment from a minimal focal position $h_1$ to a maximum focal position $h_2$ or vice versa is 50 ms. The required refocusing time DT for the situation of FIG. 3 is calculated from the pair $(h_0, h_1)$, where $h_0$ is the currently set focal position. In a position of rest, the focus can be moved to a central location $h_0$ to limit the required refocusing time DT for the next object 48.

If the available focusing time dt is sufficient in comparison with the required refocusing time Dt, that is $dt \geq DT$, the ideal focal position is then set and a recording that is ideally in focus within the framework of the possibilities of the camera 10 is triggered as soon as the object 48 is in the recording position. The problematic case is that the available focusing time dt is not sufficient. A compensation strategy is then applied. An image is not recorded at an ideal focal position, but rather at a focal position that can be reached faster. A certain blur is thereby accepted that is, however, well-defined and furthermore makes it possible to achieve the desired purpose with the image recording, for example to read a code 52. It will be explained later with reference to FIG. 5 how a still permitted focus deviation can in particular be fixed using a depth of field range associated with the respective distance.

There are now a plurality of possible compensation strategies that can be applied individually or in combination when the available focusing time dt is not sufficient and which focus deviation could still be tolerated is known. Combining compensation strategies can also mean triggering a plurality of image recordings in order, for example, to record both a somewhat blurred image at an ideal object location and a focused image in an object position that is no longer fully ideal.

An image recording can take place with the still tolerated focus deviation at a focal position $h_1'$ that is closer to the instantaneous focal position than $h_1$ and that is accordingly reached faster. There is then a possibility of nevertheless adjusting the focal position to the ideal focal position $h_1$ even though it is clear that this focus adjustment will not be carried out to the end in sufficient time. An image recording is then triggered prematurely as soon as at least the focal position $h_1'$ has been reached. The refocusing time $DT'<DT$ required for this purpose can be determined in advance and triggering takes place after DT'. The image recording can be triggered directly at the focal position $h_1'$ or the available focusing time dt is made use of and an image recording is then triggered at a focal position $h_1''$ between $h_1$ and $h_1'$.

A further possibility is to set the focal position $h_1'$ instead of the ideal focal position at the closer margin of the tolerance framework or depth of field range given by the still permitted focus deviation or a focal position $h_1'$ between $h_1$ and $h_1'$ that can just still be reached in the available focusing time $d_1$. This is only possible when the available focusing time dt is at least sufficient for this adjustment, for which purpose a new required refocusing time DT' can be determined. It would otherwise, however, also be conceivable to make a setting to said focal position $h_1'$ at the margin of the depth of field range and only then to trigger the image recording. The object 52 has then moved a little too far, but unlike with an image with a known insufficient image definition, an image recorded a little too late can absolutely still be usable, for example still include the code 52. The object offset is at least smaller than if one were to wait until the focal position actually corresponds to the ideal focal position $h_1$, with an image recording also being conceivable at that even later point in time, in particular for an additional image.

FIG. 4 again shows a camera 10 having a downwardly directed detection zone 14 similar to FIG. 3. Here, however, a further object 48a follows at a short distance whose height $h_2$ differs considerably from the height $h_1$ of the first object 48. A recording of the further object 48a that is calculated from the distance $d_2$ covered should be produced at a time $t_2$. The values $d_2$, $h_2$ and $t_2$ are calculated in an analog manner to the values $d_1$, $h_1$ and $t_2$, but can naturally only be determined when the distance sensor 24 detects the further object 48a for the first time.

Figure 4:
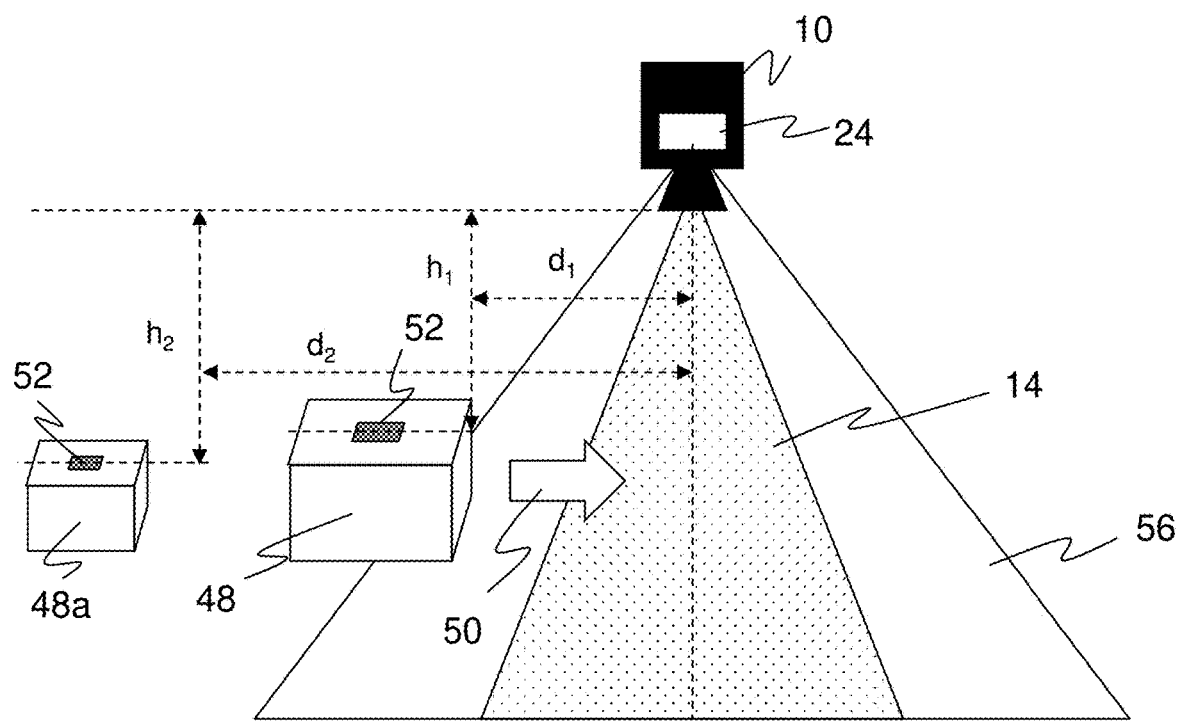
FIG. 4 a representation similar to FIG. 3, now with two moving objects of different heights moving after one another.

The available focusing time is now $d_1=t_1-t_2$ and refocusing has to take place from $h_1$ to $h_2$ for the recording of the further object 48a after the recording of the object 48 and the required refocusing time DT results from this. With these values, the explanations on FIG. 3 apply analogously to produce a recording at a focal position $h_1$ with an available focusing time dt that is too short that at most has a still tolerable focus deviation. The situation of FIG. 4 is possibly even more critical than that of FIG. 3 in dependence on the object distance $d_2-d_1$ and the height difference $h_2-h_1$ and therefore in particular profits from the described refocusing that where necessary fully reaches the ideal focal position $h_2$ and is in turn faster.

Up to now, the question as to which focus deviations can still be tolerated has only been briefly considered and should now finally be looked at more exactly. In this respect, a distinction can be made between purely optical or physical demands and application-specific demands. A possibility of considering a focus adjustment as still small enough is if the difference between the set and the ideal focal positions still remains in the depth of field range, with the extent of the depth of field range in turn having a dependency on the respective focal position or on the respective object distance.

A physical depth of field range $DOF_p(h)$ can be approximated by the formula $DOF_p(h) \sim 2h^2Nc/f^2$. Here, h is the distance between the camera 10 and the object 48; N is the numerical aperture $f_{num}$ of the objective of the reception optics 16 and is thus f-number dependent; c is the circle of confusion and corresponds to the degree of permitted blue of, for example, one pixel on the image sensor 18; and f is the focal length of the objective. A number of these are accordingly parameters of the object that are known and fixed. Further influences on the depth of field range such as the f-number or the exposure can be largely precluded by fixing or by optimum setting.

However, specific demands of the application are not taken into account in the physical depth of field range $DOF_p(h)$. This becomes clear for the example of code reading: It is ultimately not a question of whether images satisfy physical contrast criteria, but rather whether the code can be read. In some cases, this application-specific depth of field range $DOF_{app}$ can be modeled by a factor κ that depends on application-specific parameters: $DOF_{app}(h)=\kappa\ DOF_p(d)$. Typical application-specific parameters are here the module size, for example measured in pixels per module, the code type, and last but not least the decoding algorithm used. It this cannot be modeled by a simple factor κ, the possibility at least remains of determining DOFapp by simulation or experiment.

Figure 5:
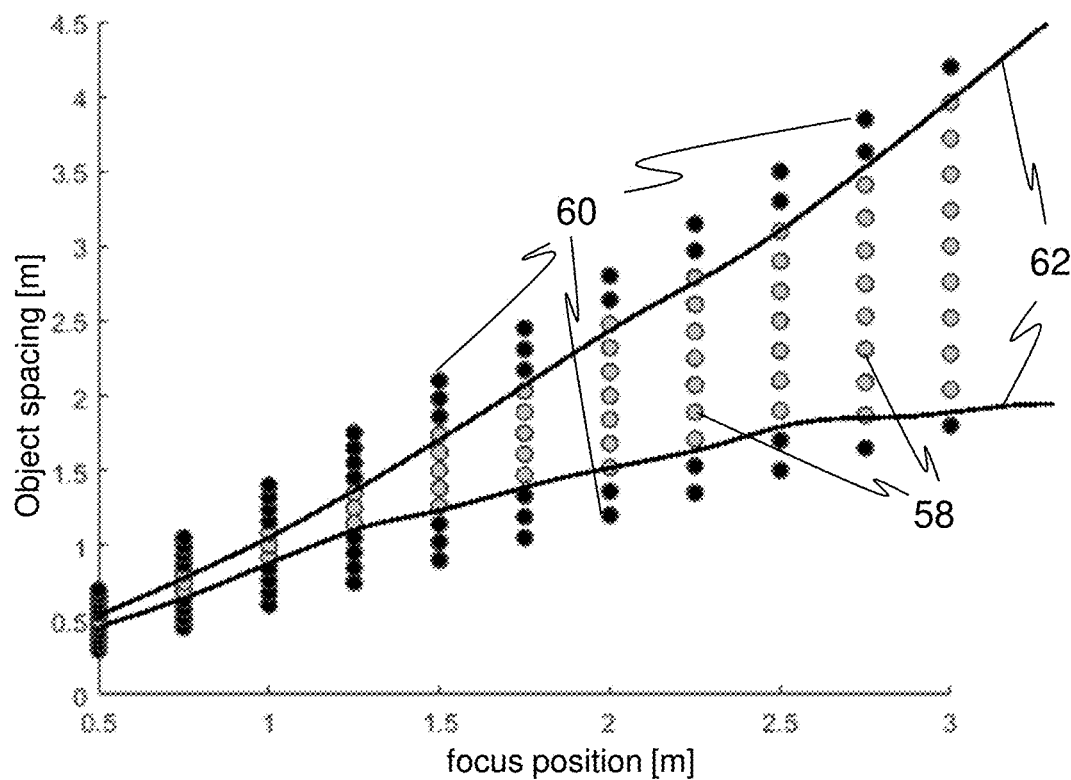
FIG. 5 a representation of successful and unsuccessful reading attempts of a code on an object at different focal positions (X axis) and object distances (Y axis).

FIG. 5 shows a representation of reading attempts of a code 52 on an object 48 at different focal positions and object distances. Light dots 58 designate successful reading attempts (GoodReads) and dark dots 60 unsuccessful reading attempts (NoReads). The two lines 62 follow the border between them and the distance interval of the two lines designates the required application-specific depth of field range DOFappd (d) in dependence on the focal position or on the object distance.

Such a diagram can be produced by measurement or simulation for specific conditions with respect to said parameters such as the code type, module size, decoding process, exposure. An association rule in the form of a function or table (lookup table, LUT) is thereby produced from which the control and evaluation unit 38 can read, with a given provisional distance value, a depth of field range and thus a still permitted focus deviation with which it is still ensured that a code will be readable. There can be a plurality of association rules for different conditions so that the suitable still permitted focus deviation is then determined in a situation and application related manner, for example in dependence on the code type, module size, exposure, and the decoder used.

The invention claimed is:

1. A camera for detecting an object moved through a detection zone, the camera comprising:
   an image sensor for recording image data,
   a reception optics having a focus adjustment unit for setting a focal position;
   a distance sensor for measuring a distance value from the object; and
   a control and evaluation unit connected to the distance sensor and the focus adjustment unit to set a focal position in dependence on the distance value,
   wherein the control and evaluation unit is configured to trigger a recording of image data at a focal position at which there is a focus deviation from a focal position that is ideal in accordance with the measured distance value, with the focus deviation remaining small enough for a required image definition of the image data,
   wherein the control and evaluation unit is configured to determine a required refocusing time from the instantaneous focal position and the focal position that is ideal in accordance with the measured distance value.

2. The camera in accordance with claim 1, wherein the control and evaluation unit is configured to determine an available focusing time from the point in time at which the object will reach the recording position.

3. The camera in accordance with claim 2, wherein the distance sensor is configured to measure the speed of the movement of the object.

4. The camera in accordance with claim 2, wherein the control and evaluation unit is configured to compare the available focusing time with the required refocusing time and only to record image data having a focal deviation when the required refocusing time is not sufficient.

5. The camera in accordance with claim 1, wherein an association rule between adjustments from a first focal position into a second focal position and a refocusing time required for this is stored in the control and evaluation unit.

6. The camera in accordance with claim 1, wherein the control and evaluation unit is configured to perform a focus adjustment to the ideal focal position, but already to record image data as soon as the focus deviation has become small enough for a required image definition.

7. The camera in accordance with claim 1, wherein the control and evaluation unit is configured to not perform a focus adjustment up to the ideal focal position, but only up to the focus deviation.

8. The camera in accordance with claim 1, wherein the control and evaluation unit is configured to delay the recording of image data beyond an available focusing time if a focal position having a focus deviation can only then be achieved that is small enough for a required image definition of the image data.

9. The camera in accordance with claim 1, wherein a distance measurement field of view of the distance sensor at least partly overlaps the detection zone.

10. The camera in accordance with claim 1, wherein the distance sensor is integrated in the camera.

11. The camera in accordance with claim 9, wherein the distance measurement field of view is oriented such that an object is detected before it enters into the detection zone.

12. The camera in accordance with claim 1, wherein the distance sensor is configured as an optoelectronic distance sensor.

13. The camera in accordance with claim 12, wherein the optoelectronic distance sensor is in accordance with the principle of the time of flight process.

14. The camera in accordance with claim 1, wherein the control and evaluation unit is configured to evaluate the focus deviation as small enough for a required image definition when the object is still in a depth of field range according to the distance measurement value on a triggering of the recording of the image data in the set focal position.

15. The camera in accordance with claim 14, wherein the depth of field range is a depth of field range determined from optical properties and/or from application-specific demands.

16. The camera in accordance with claim 1, wherein the control and evaluation unit is configured to read a code content of a code on the object using the image data.

17. The camera in accordance with claim 16, wherein the control and evaluation unit is configured to evaluate the focus deviation as small enough for a required image definition of the image data if the image definition is sufficient to read a recorded code.

18. The camera in accordance with claim 17, wherein a sufficiency of the image definition being sufficient to read a recorded code is dependent on at least one of a code type, a module size, and a decoding process.

19. The camera in accordance with claim 1, that is installed in a stationary manner at a conveying device that guides objects to be detected in a direction of conveying through the detection zone.

20. A method of detecting image data of an object moved through a detection zone, in which a distance value from the object is measured by a distance sensor and a focal position of a reception optics is set in dependence on the distance value, wherein a recording of image data is triggered at a focal position at which there is a focus deviation from a focal position that is ideal in accordance with the measured distance value, with the focus deviation remaining small enough for a required image definition of the image data, and wherein a required refocusing time is determined from the instantaneous focal position and the focal position that is ideal in accordance with the measured distance value.

* * * * *